(12) United States Patent
Lemma et al.

(10) Patent No.: US 7,266,466 B2
(45) Date of Patent: Sep. 4, 2007

(54) WATERMARK TIME SCALE SEARCHING

(75) Inventors: Aweke Negash Lemma, Eindhoven (NL); Leon Maria Van De Kerkhof, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 207 days.

(21) Appl. No.: 10/509,411

(22) PCT Filed: Feb. 26, 2003

(86) PCT No.: PCT/IB03/00794

§ 371 (c)(1),
(2), (4) Date: Sep. 23, 2004

(87) PCT Pub. No.: WO03/083859

PCT Pub. Date: Oct. 9, 2003

(65) Prior Publication Data

US 2005/0177332 A1    Aug. 11, 2005

(30) Foreign Application Priority Data

Mar. 28, 2002   (EP) .................................. 02076202

(51) Int. Cl.
*H04B 1/10* (2006.01)
(52) U.S. Cl. .................. 702/106; 702/107; 702/88; 702/189; 375/348
(58) Field of Classification Search ................. 702/106
See application file for complete search history.

(56) References Cited

U.S. PATENT DOCUMENTS

| | | | |
|---|---|---|---|
| 6,522,767 B1 * | 2/2003 | Moskowitz et al. | 382/100 |
| 6,674,876 B1 * | 1/2004 | Hannigan et al. | 382/100 |
| 6,684,199 B1 * | 1/2004 | Stebbings | 705/57 |
| 6,718,501 B1 * | 4/2004 | Brody et al. | 714/752 |
| 6,975,745 B2 * | 12/2005 | Bradley | 382/100 |
| 2002/0172116 A1 * | 11/2002 | Aprea et al. | 369/53.21 |
| 2003/0079131 A1 * | 4/2003 | Reefman | 713/176 |
| 2003/0081810 A1 * | 5/2003 | Bradley | 382/100 |
| 2003/0163305 A1 * | 8/2003 | Cheng et al. | 704/219 |
| 2004/0022444 A1 * | 2/2004 | Rhoads | 382/232 |
| 2004/0052369 A1 * | 3/2004 | Stebbings | 380/200 |
| 2004/0073916 A1 * | 4/2004 | Petrovic et al. | 725/18 |

(Continued)

FOREIGN PATENT DOCUMENTS

WO           01/69518        9/2001

(Continued)

OTHER PUBLICATIONS

Lemma et al., "A Robustness and Audibility Analysis of a Temporal Envelope Modulating Audio Watermark", IEEE, 2002.*

(Continued)

*Primary Examiner*—Hal Wachsman
(74) *Attorney, Agent, or Firm*—Paul Im

(57) ABSTRACT

Method and apparatus are described for compensating for a linear time scale change in a received signal, so as to correctly rescale the frame sequence of the received signal. Firstly, an initial estimate of the sequence of symbols is extracted from the received signal. Successive estimates of correctly time scaled sequences of the symbols are then generated by interpolating the values of the initial estimates.

13 Claims, 15 Drawing Sheets

U.S. PATENT DOCUMENTS

| | | | |
|---|---|---|---|
| 2004/0199855 A1* | 10/2004 | Heylen | 714/769 |
| 2004/0267533 A1* | 12/2004 | Hannigan et al. | 704/273 |
| 2005/0094848 A1* | 5/2005 | Carr et al. | 382/100 |
| 2005/0135656 A1* | 6/2005 | Alattar et al. | 382/100 |
| 2005/0147248 A1* | 7/2005 | Lemma et al. | 380/203 |
| 2005/0152549 A1* | 7/2005 | Lemma et al. | 380/255 |
| 2005/0165690 A1* | 7/2005 | Liu et al. | 705/57 |
| 2005/0166068 A1* | 7/2005 | Lemma et al. | 713/194 |
| 2005/0177332 A1* | 8/2005 | Lemma et al. | 702/106 |
| 2005/0240767 A1* | 10/2005 | Lemma et al. | 713/176 |
| 2005/0240768 A1* | 10/2005 | Lemma et al. | 713/176 |

FOREIGN PATENT DOCUMENTS

| | | |
|---|---|---|
| WO | 01/99109 | 12/2001 |
| WO | 03/083859 | 10/2003 |

OTHER PUBLICATIONS

Lemma et al., "A Temporal Domain Audio Watermarking Technique", IEEE, 2003.*

Bassia et al., "Robust Audio Watermarking in the Time Domain", IEEE Transactions on Multimedia, col. 3, No. 2, Jul. 2001, pp. 232-241.

Van Der Veen et al., "Robust, Multi-Functional and High Quality Audio Watermarking Technology", Preprints of Papers Presented at the AES Convention, col. 110, No. 5345, May 12, 2001, pp. 1-9.

Zwicker et al., "Audio Engineering and Psychoacoustics: Matching Signals to the Final Receiver, the Human Auditory System", J. Audio Eng. Soc., vol. 39, No. 3, Mar. 1991, pp. 115-126.

* cited by examiner

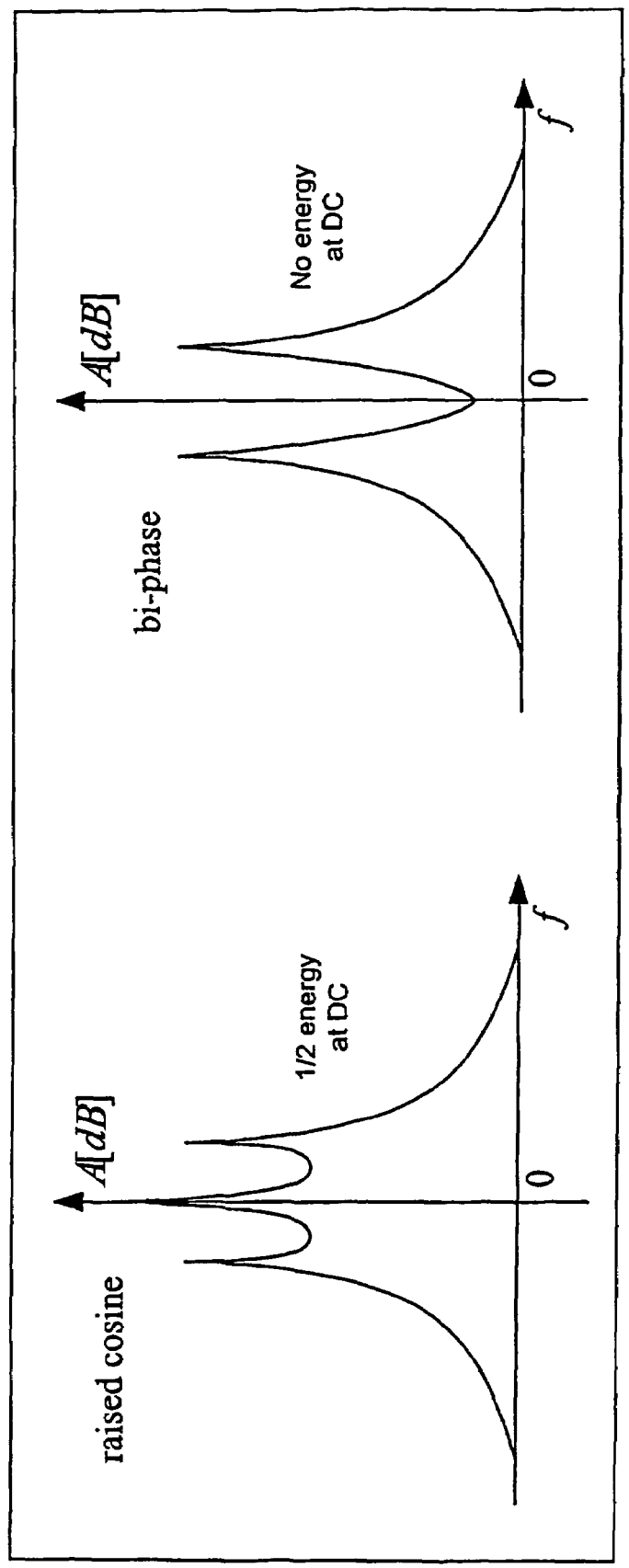

WATERMARK TIME SCALE SEARCHING

This application is filed under 35 U.S.C. 371 and is a U.S. national stage application of International Application No. PCT/IB2003/00794, entitled "Watermark Time Scale Searching," filed Feb. 26, 2003, and claims the priority thereof. International Application No. PCT/IB2003/00794 claims priority to European Application No. 02076202.7, entitled "Watermark Time Scale Searching," filed Mar. 28, 2002.

The present invention relates to apparatus and methods for decoding information that has been embedded in information signals, such as audio, video or data signals.

Watermarking of information signals is a technique for the transmission of additional data along with the information signal. For instance, watermarking techniques can be used to embed copyright and copy control information into audio signals.

The main requirement of a watermarking scheme is that it is not observable (i.e. in the case of an audio signal, it is inaudible) whilst being robust to attacks to remove the watermark from the signal (e.g. removing the watermark will damage the signal). It will be appreciated that the robustness of a watermark will normally be a trade off against the quality of the signal in which the watermark is embedded. For instance, if a watermark is strongly embedded into an audio signal (and is thus difficult to remove) then it is likely that the quality of the audio signal will be reduced.

In digital devices, it is typically assumed that there exists up to a 1% drift in sampling (clock) frequency. During transmission of the signal through an analog channel, this drift is normally manifested as a stretch or shrink in the time domain signal (i.e. a linear time scale change). A watermark embedded in the time domain (e.g. in an audio signal) will be affected by this time stretch or shrink as well, which can make watermark detection very difficult or even impossible. Thus, in the implementation of a robust watermarking scheme, it is extremely important to find solutions to such time scale modifications.

In known time domain watermarking schemes, any linear time scale change within the signal is resolved by repeatedly running the watermark detection (including repeating the extraction of the watermark from the host signal) for the different possible time scales, until all the possible time scales are exhausted, or detection is achieved. Performing such searches over the possible time scaling ranges requires a large computational overhead, and is thus costly in terms of both hardware and computational time. Consequently, real time implementation of a watermark detector utilizing such a time scale search technique is not feasible.

In watermarking schemes implemented within the frequency domains, it is common to perform the scale search by modifying the frequency domain coefficients. For instance, this can be achieved by carefully shrinking or stretching the frequency domain samples. In principle, such a frequency domain solution could be directly applied to time domain watermark signals. However, since the watermarks are directly embedded in the time domain samples, the time scale search needs to be performed in the time domain as well. Normally, there are only a few thousand frequency domain samples, whilst the time domain signals contain samples in the order of millions. Consequently, such an application of the frequency domain solution to time domain signals is computationally too expensive.

It is an object of the present invention to provide a watermark decoding scheme for time domain watermarked signals that utilizes a time scale search that substantially addresses at least one of the problems of the prior art.

In a first aspect, the present invention provides a method of compensating for a linear time scale change in a received signal, the signal being modified by a sequence of symbols in the time domain, the method comprising the steps of: (a) extracting an initial estimate of the sequence of symbols from said received signal; (b) forming an estimate of a correctly time scaled sequence of the symbols by interpolating the values of said initial estimate.

Preferably, step (b) is repeated so as to provide a range of estimates corresponding to different time scalings.

Preferably, said interpolation is at least one of zeroth order interpolation, linear interpolation, quadratic interpolation and cubic interpolation.

Preferably, the method further comprises the step of processing each estimate as though it were the correctly time scaled sequence of the symbols, so as to determine which estimate is the best estimate.

Preferably, the method further comprises the steps of correlating each of said estimates with a reference corresponding to said sequence of symbols; and taking the estimate with the maximum correlation peak as the best estimate.

Preferably, said initial estimate of the sequence of symbols is stored in a buffer.

Preferably, said buffer is of total length M, the total number of scale searches conducted is $$N_\eta = \frac{M}{2}(\eta_{max} - \eta_{min})$$

where $\eta_{min}$, $\eta_{max}$ correspond respectively to the minimum and maximum likely time scale modifications of the signal.

Preferably, said initial estimates of the sequence of symbols comprises a sequence of $N_b$ estimates for each symbol, each of the $N_b$ estimates corresponding to a different time offset of a symbol.

Preferably, the scale search in the next detection window is adapted based on the information acquired during the current detection window.

Preferably, the scale space is searched using an optimal searching algorithm.

Preferably, the searching algorithm is the grid refinement algorithm.

In another aspect, the present invention provides a computer program arranged to perform the method as described above.

In further aspects, the present invention provides a record carrier comprising the computer program, and a method of making available for downloading the computer program.

In another aspect, the present invention provides an apparatus arranged to compensate for a linear time scale change in a received signal, the signal being modified by a sequence of symbols in the time domain, the apparatus comprising: an extractor arranged to extract an initial estimate of the sequence of symbols from said received signal; and an interpolator arranged to form an estimate of a correctly time scaled sequence of the symbols by interpolating the values of said initial estimate.

Preferably, the apparatus further comprises a buffer arranged to store one or more of said estimates.

In another aspect, the present invention provides a decoder comprising the apparatus as described above.

For a better understanding of the invention, and to show how embodiments of the same may be carried into effect, reference will now be made, by way of example, to the accompanying diagrammatic drawings in which:

FIGS. 7a and 7b show respectively the frequency spectra for a watermark sequence conditioned with a raised cosine and a bi-phase shaping window function;

Figure 8:
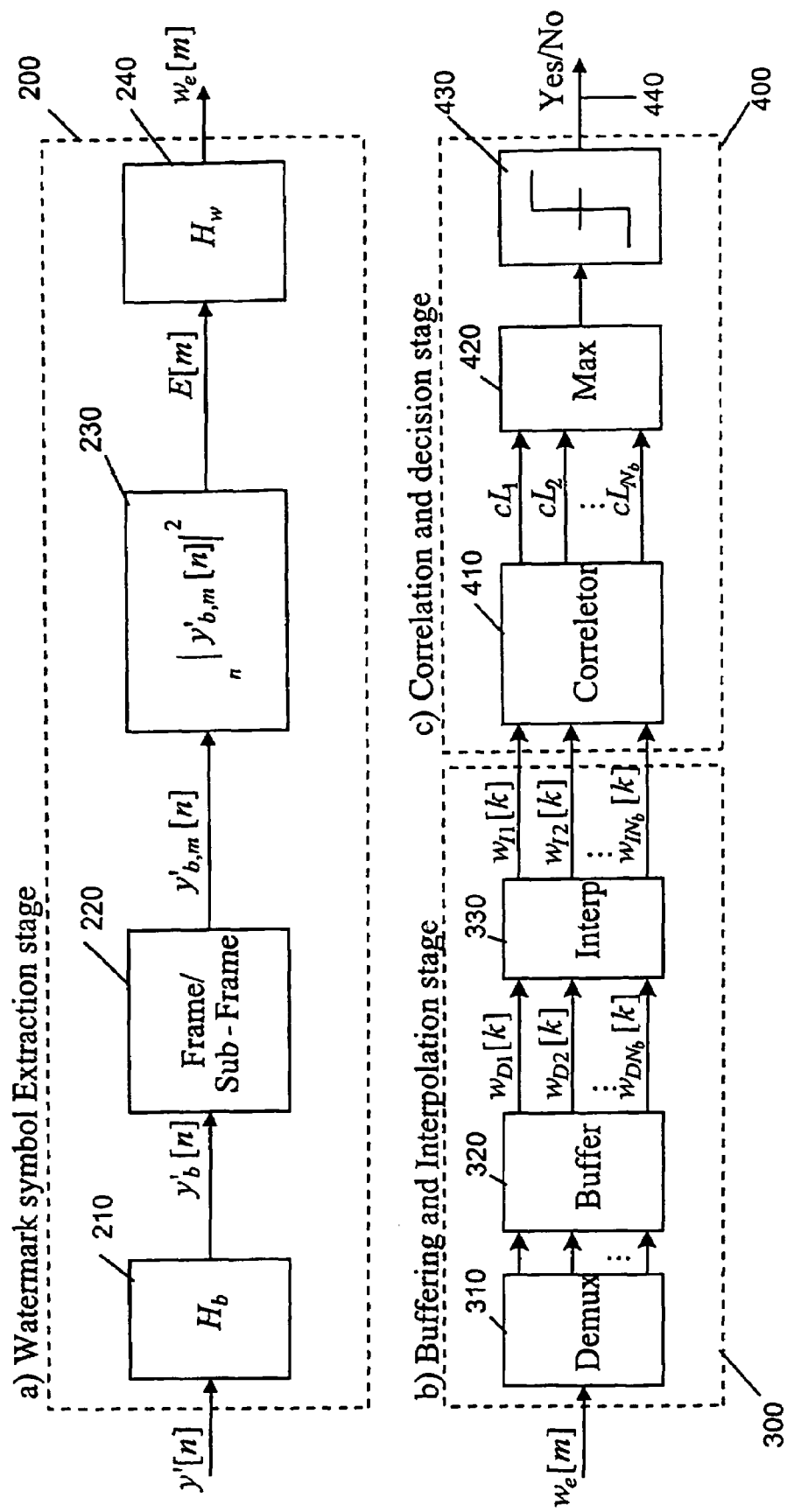
FIG. 8 is a diagram illustrating a watermark detector in accordance with an embodiment of the present invention.
Figure 9:
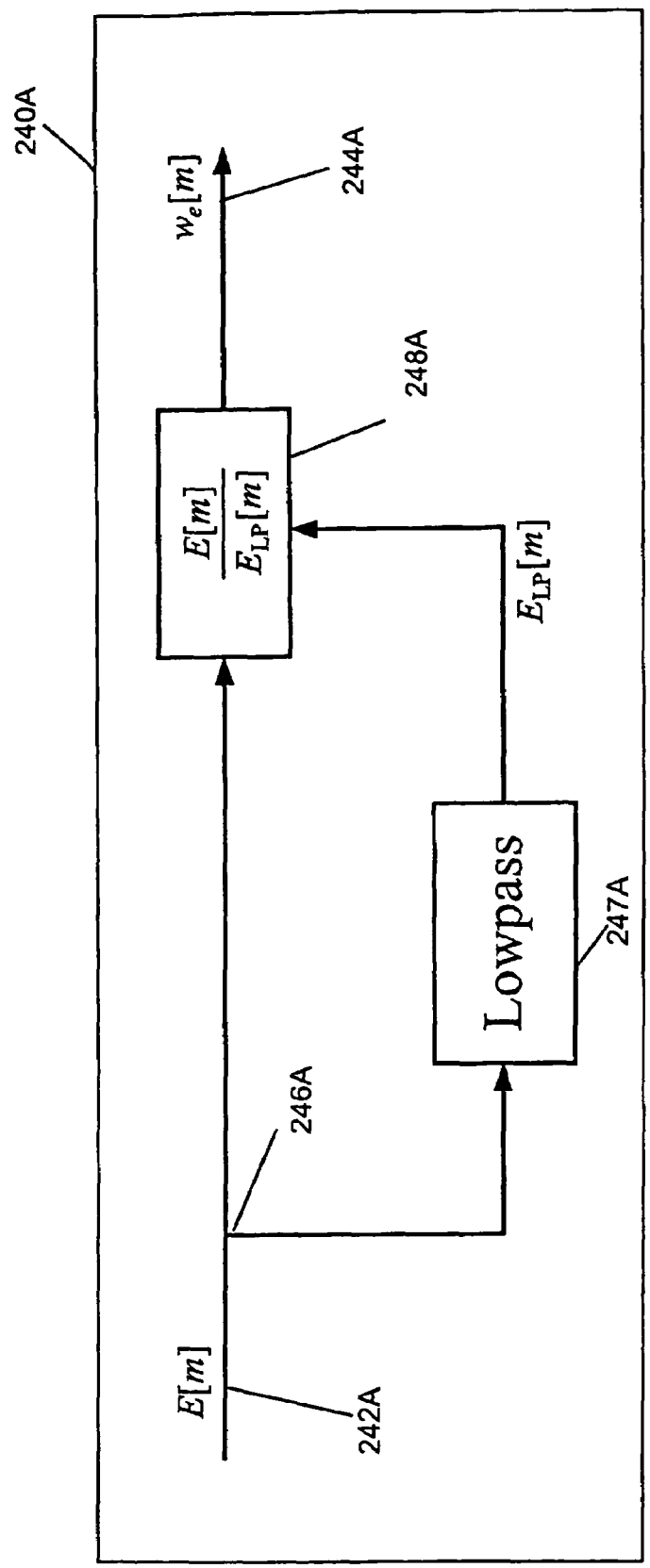
Figure 10:
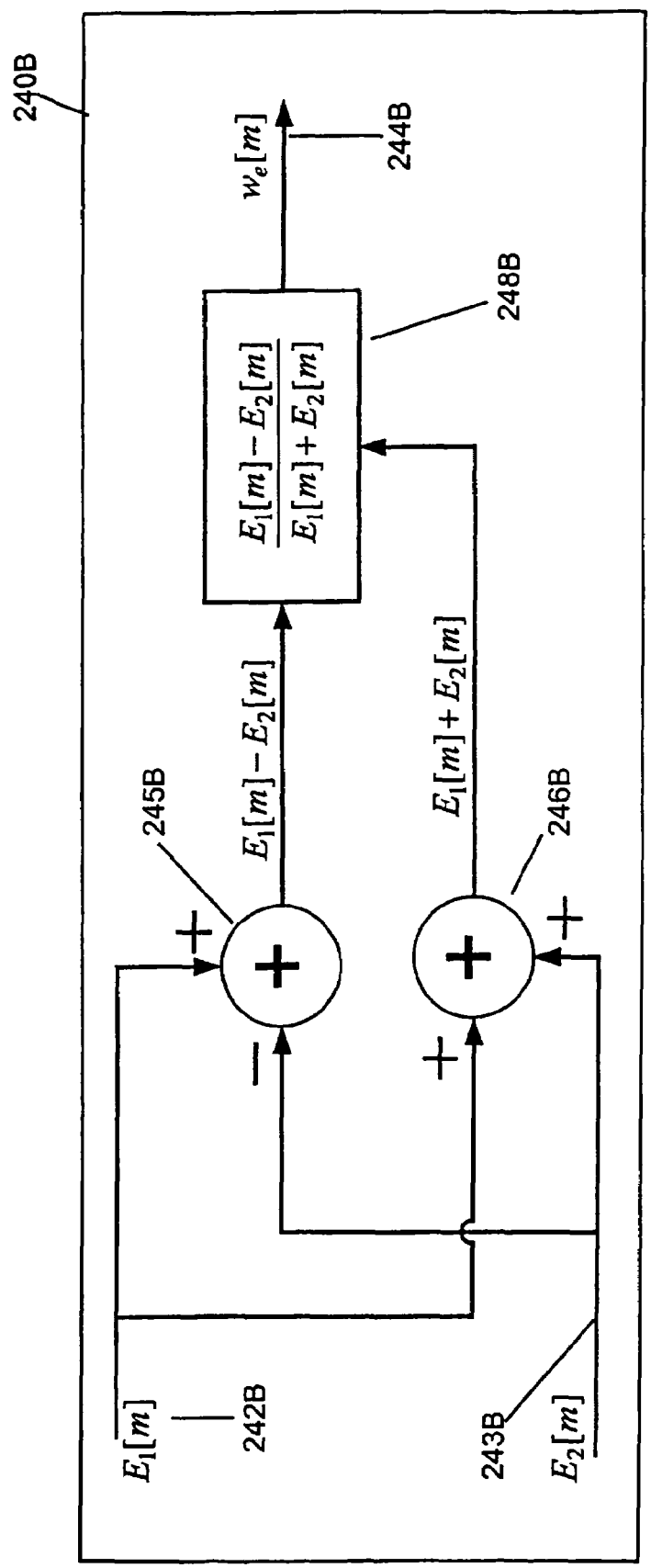
Figure 11:
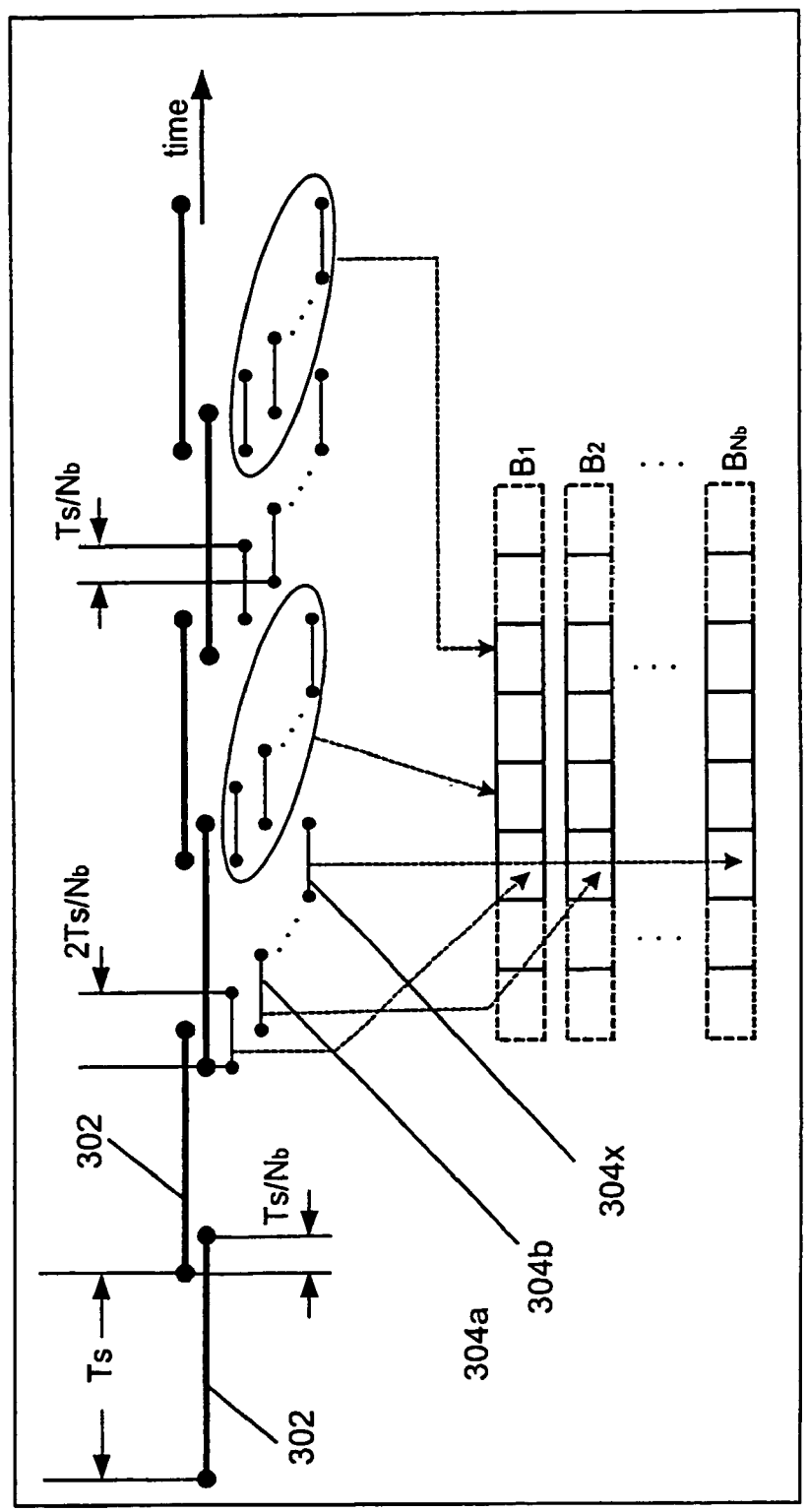
Figure 12:
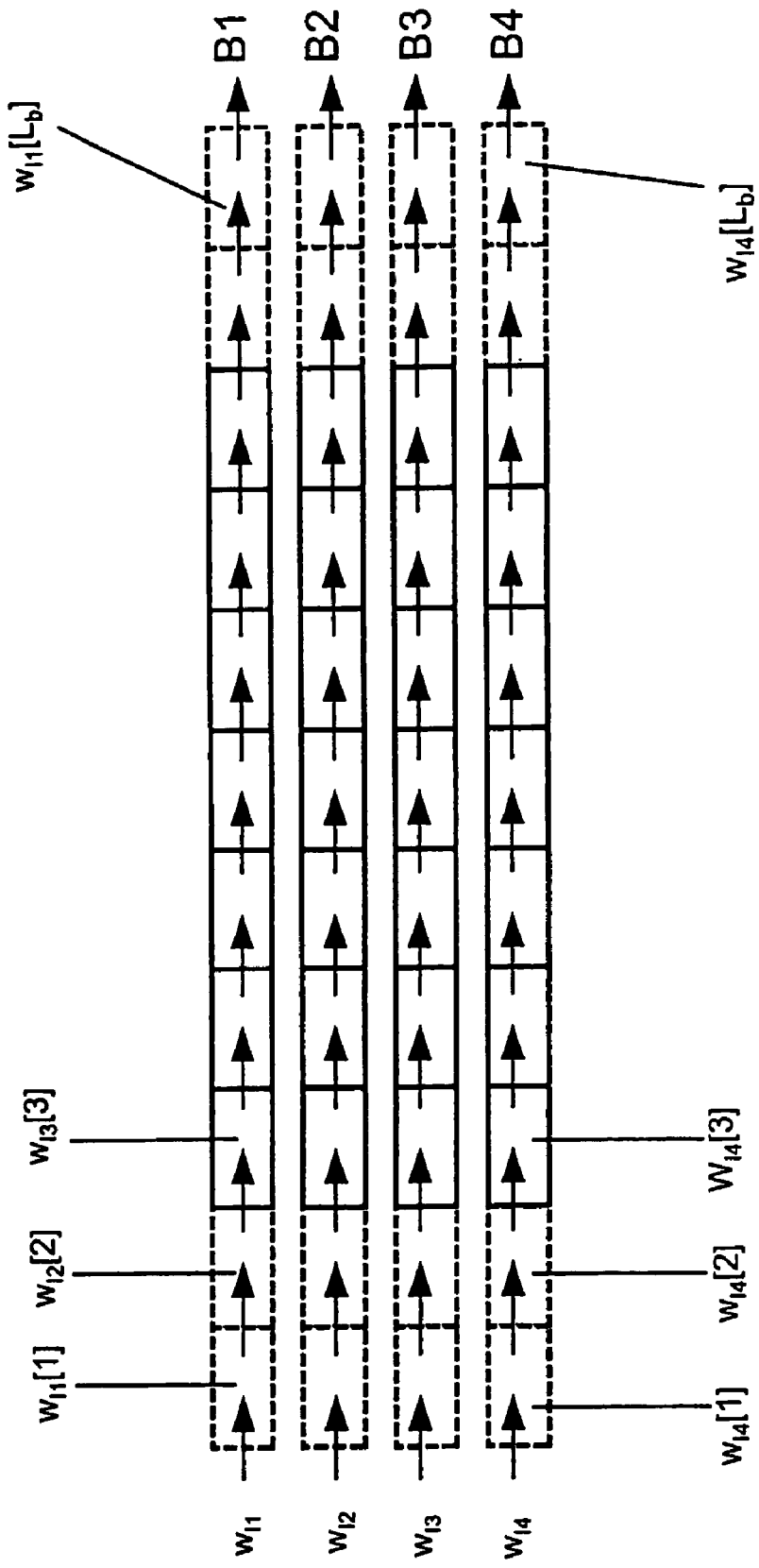
Figure 13A:
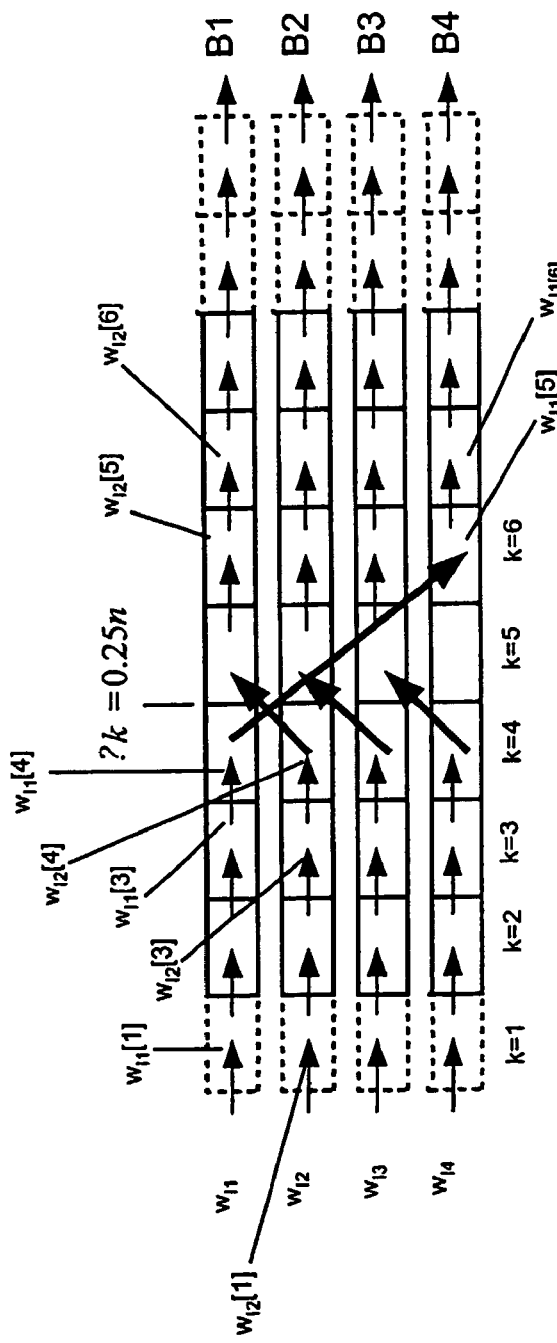
Figure 13B:
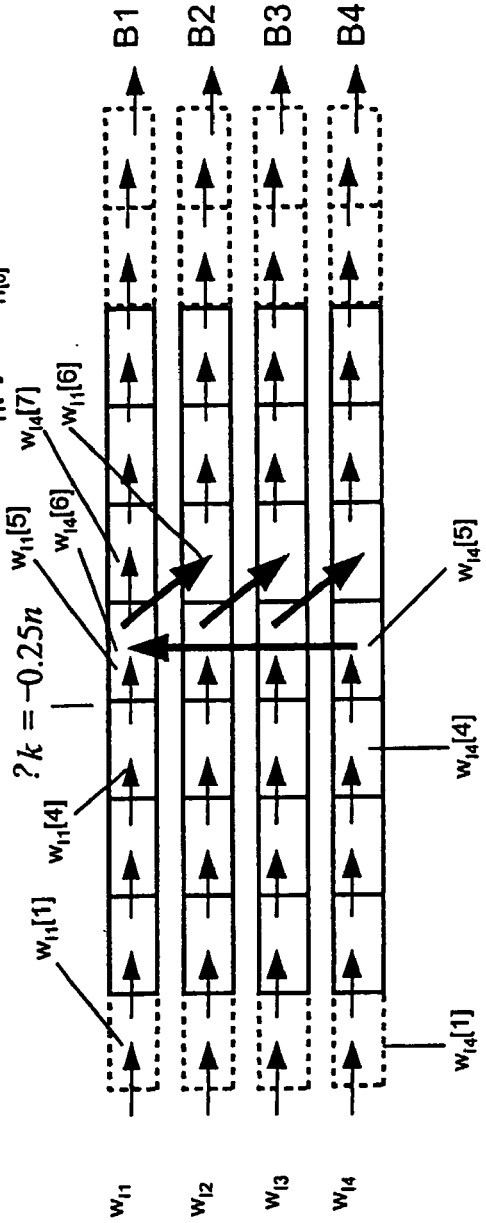
Figure 14:
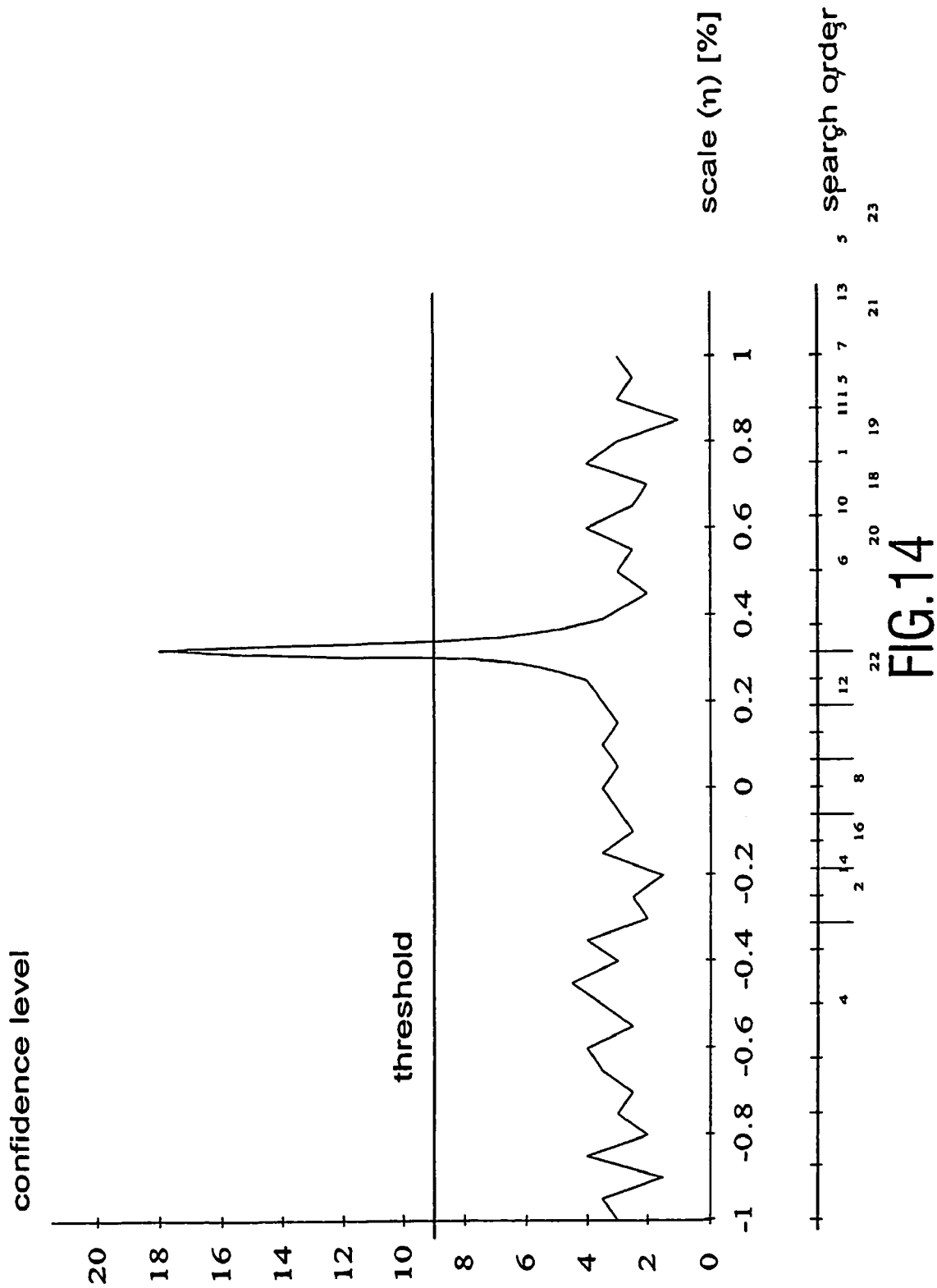
Figure 15:
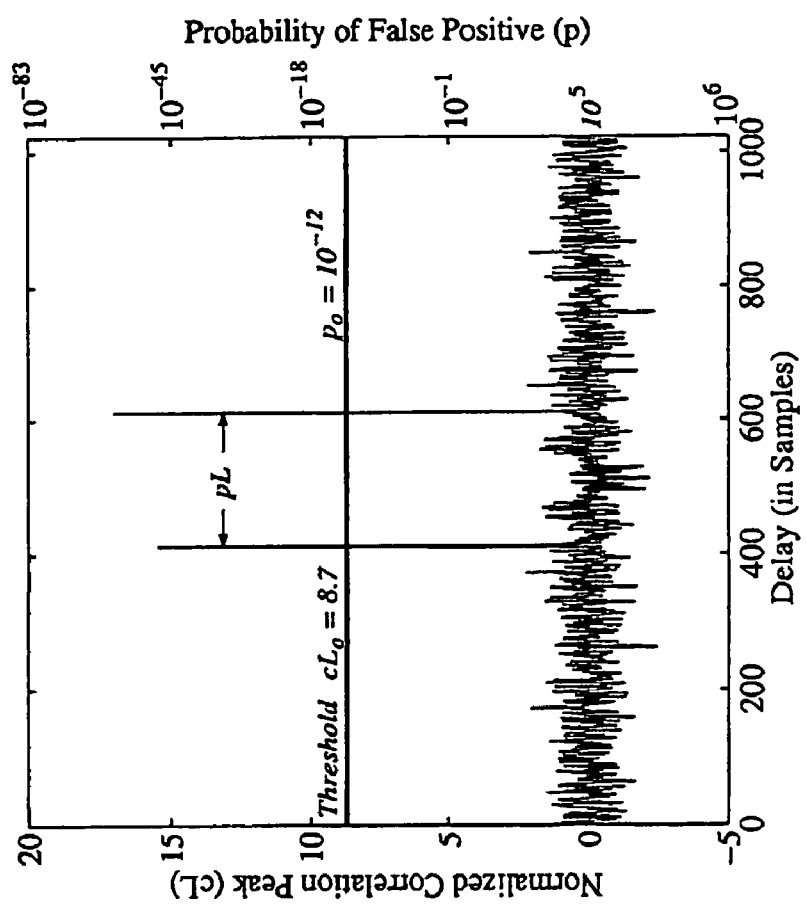

FIG. 9 diagrammatically shows the whitening filter $H_w$ of FIG. 8, for use in conjunction with a raised cosine shaping window function;

FIG. 10 diagrammatically shows the whitening filter $H_w$ of FIG. 8, for use in conjunction with a bi-phase window shaping function;

FIG. 11 shows details of the watermark symbol extraction and buffering processes in accordance with an embodiment of the present invention;

FIG. 12 illustrates a sequence in which estimates of watermark symbols are collected from four buffers when there is no time scale modification;

FIGS. 13a and 13b illustrate the different sequences, according to an embodiment of the present invention, in which estimates of watermark symbols can be collected from four buffers when there is respectively a time stretch and a time shrink time scale modification;

FIG. 14 shows an example of an efficient scale search technique based on the concept of grid refinement; and FIG. 15 shows a typical shape of the correlation function output from the correlator of the watermark detector shown in FIG. 8.

Figure 1:
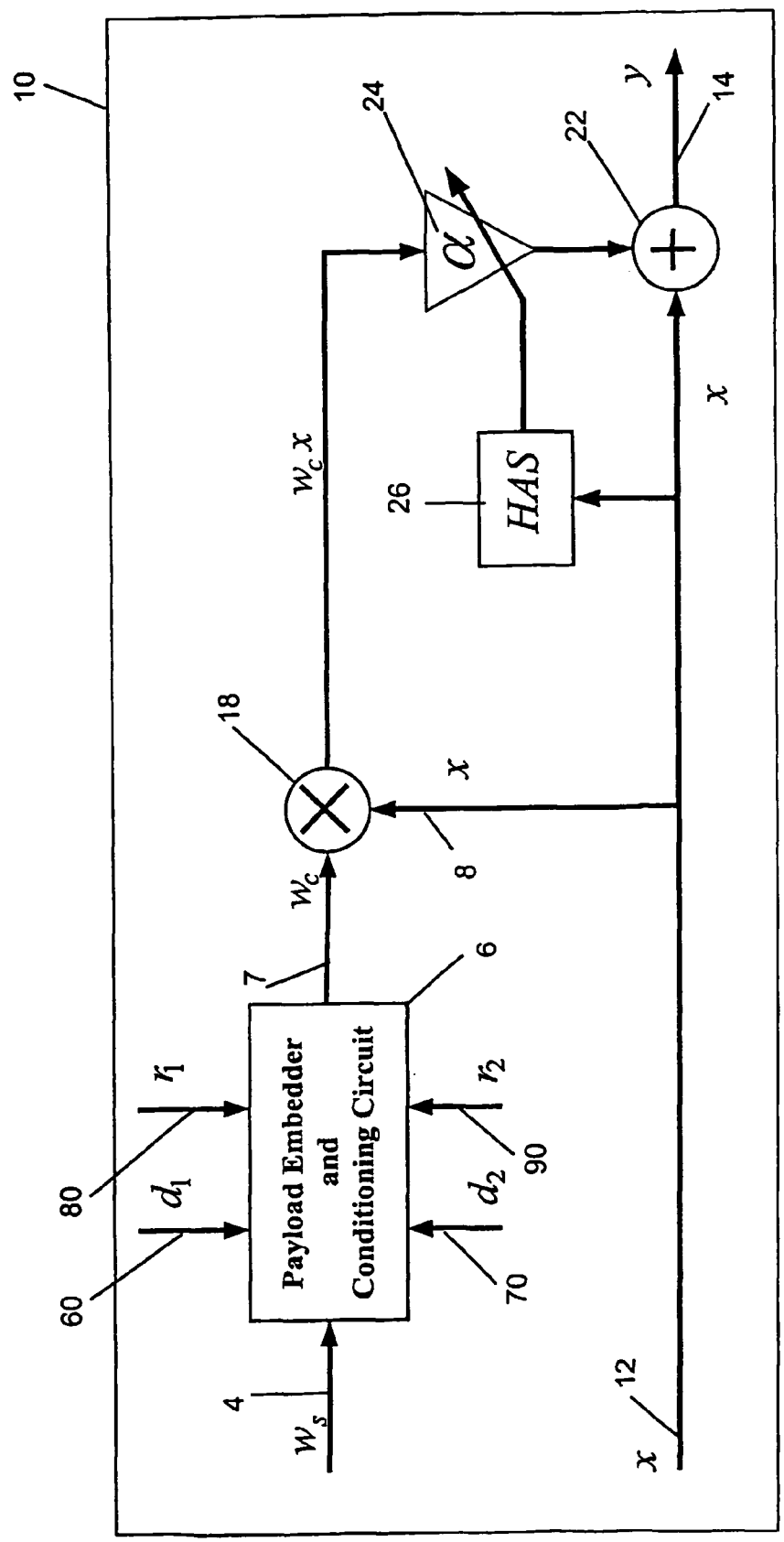
FIG. 1 is a diagram illustrating a watermark embedding apparatus.

FIG. 1 shows a block diagram of the apparatus required to perform the digital signal processing for embedding a multi-bit payload watermark w into a host signal x.

A host signal x is provided at an input 12 of the apparatus. The host signal x is passed in the direction of output 14 via the adder 22. However, a replica of the host signal x (input 8) is split off in the direction of the multiplier 18, for carrying the watermark information.

The watermark signal $w_c$ is obtained from the payload embedder and watermark conditioning apparatus 6, and derived from a reference finite length random sequence $w_s$ input to the payload embedder and watermark conditioning apparatus. The multiplier 18 is utilized to calculate the product of the watermark signal $w_c$ and the replica audio signal x. The resulting product, $w_c$x is then passed via a gain controller 24 to the adder 22. The gain controller 24 is used to amplify or attenuate the signal by a gain factor α.

The gain factor α controls the trade off between the audibility and the robustness of the watermark. It may be a constant, or variable in at least one of time, frequency and space. The apparatus in FIG. 1 shows that, when α is variable, it can be automatically adapted via a signal analyzing unit 26 based upon the properties of the host signal x. Preferably, the gain α is automatically adapted, so as to minimize the impact on the signal quality, according to a properly chosen perceptibility cost-function, such as a psycho-acoustic model of the human auditory system (HAS) in case of an audio signal. Such a model is, for instance, described in the paper by E. Zwicker, "Audio Engineering and Psychoacoustics: Matching signals to the final receiver, the Human Auditory System", Journal of the Audio Engineering Society, Vol. 39, pp. Vol. 115-126, March 1991.

In the following, an audio watermark is utilized, by way of example only, to describe this embodiment of the present invention.

The resulting watermark audio signal y is then obtained at the output 14 of the embedding apparatus 10 by adding an appropriately scaled version of the product of $w_c$ and x to the host signal:

$$y[n]=x[n]+\alpha w_c[n]x[n]. \quad (1)$$

Preferably, the watermark $w_c$ is chosen such that when multiplied with x, it predominantly modifies the short time envelope of x.

Figure 2:
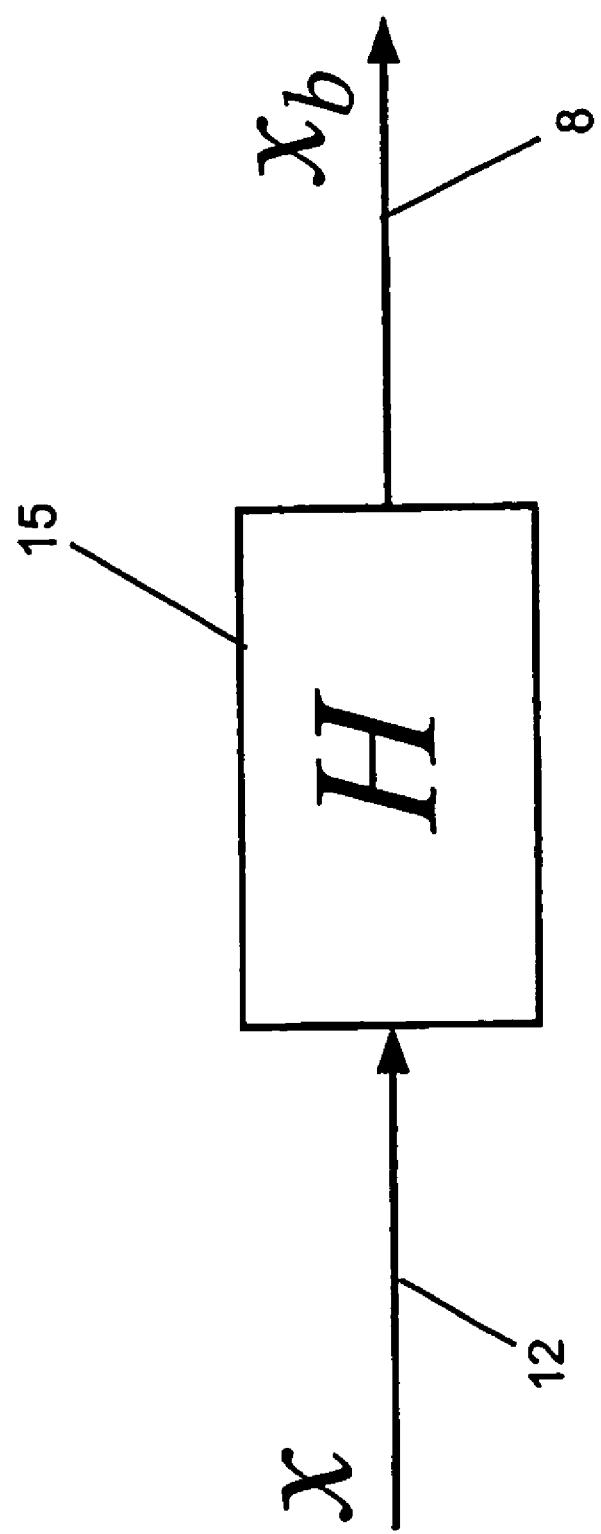
FIG. 2 shows a signal portion extraction filter H.

FIG. 2 shows one preferred embodiment in which the input 8 to the multiplier 18 in FIG. 1 is obtained by filtering a replica of the host signal x using a filter H in the filtering unit 15. If the filter output is denoted by $x_b$, then according to this preferred embodiment, the watermark signal is generated by adding the product of $x_b$ and the watermark $w_c$ to the host signal x:

$$y[n]=x+\alpha w_c[n]x_b[n]. \quad (2)$$

Let $\bar{x}_b$ be defined such that $\bar{x}_b=x-x_b$, and $y_b$ be defined such that $y=y_b+\bar{x}_b$, then the envelope modulated portion $y_b$ of the watermarked signal y is given as $$y_b[n]=(1+w_c[n])x_b[n] \quad (3)$$

Figure 3:
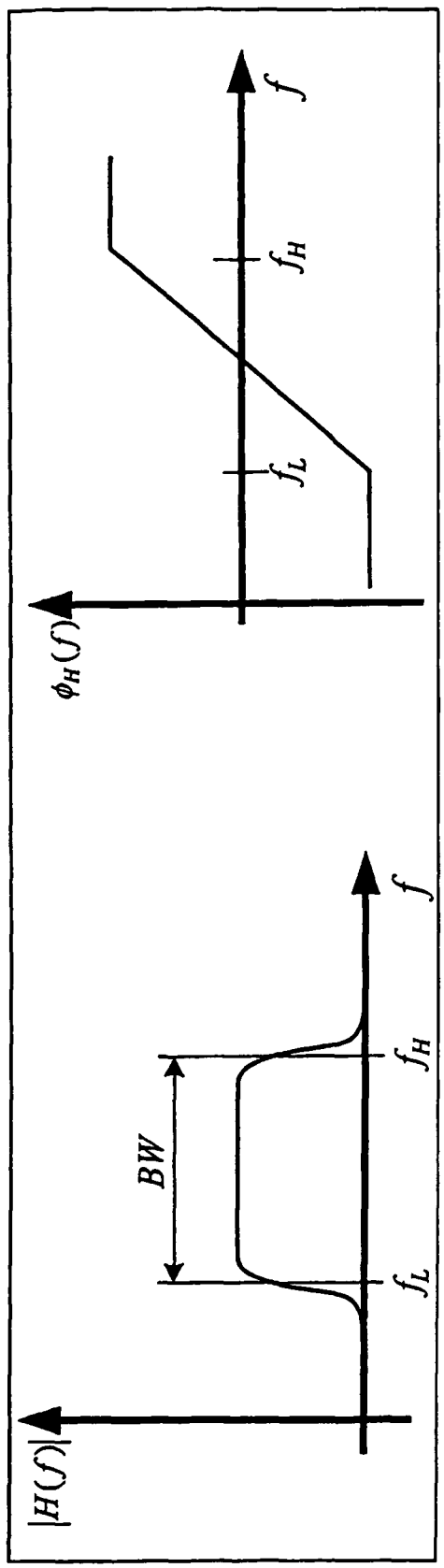
FIGS. 3a and 3b show respectively the typical amplitude and phase responses as a function of frequency of the filter H shown in FIG. 2.

Preferably, as shown in FIG. 3a, the filter H is a linear phase band pass filter characterized by its lower cut-off frequency $f_L$ and upper cut-off frequency $f_H$. As can be seen in FIG. 3b, the filter H has a linear phase response with respect to frequency f within the pass-band (BW). Thus, when H is a band pass filter, $x_b$ and $\bar{x}_b$ are the in-band and out-of-band components of the host signal respectively. For optimum performance, it is preferable that the signals $x_b$ and $\bar{x}_b$ are in phase. This is achieved by appropriately compensating for the phase distortion produced by filter H. In the case of a linear phase filter, the distortion is a simple time delay.

Figure 4:
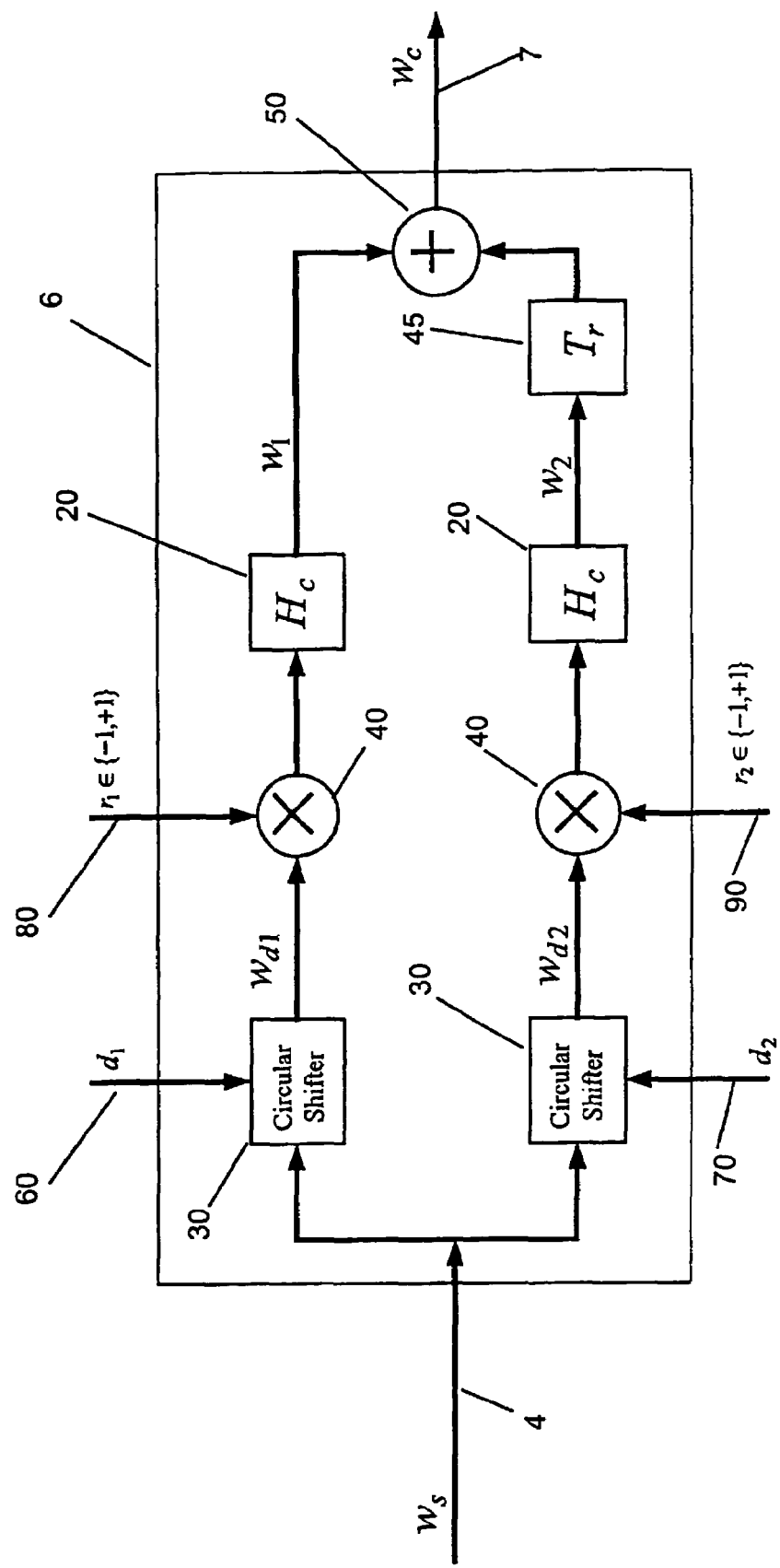
FIG. 4 shows the payload embedding and watermark conditioning stage of the apparatus shown in FIG. 1.

In FIG. 4, the details of the payload embedder and watermark conditioning unit 6 is shown. In this unit, the initial reference random sequence $w_s$ is converted into a multi-bit watermark signal $w_c$.

Firstly a finite length, preferably zero mean and uniformly distributed random sequence $w_s$, from now on also referred to as the watermark seed signal, is generated using a random number generator with an initial seed S. As will be appreciated later, it is preferable that this initial seed S is known to both the embedder and the detector, such that a copy of the watermark signal can be generated at the detector for comparison purposes. This results in the sequence of length $L_w$ $$w_s[k] \in [-1,1], \text{ for } k=0,1,2, \ldots, L_w-1 \quad (4)$$

It should be noted that in some applications, the seed can be transmitted to the detector via an alternate channel or can be derived from the received signal using some pre-determined protocol.

Then the sequence $w_s$ is circularly shifted by the amounts $d_1$ and $d_2$ using the circularly shifting unit 30 to obtain the random sequences $w_{d1}$ and $w_{d2}$ respectively. It will be appreciated that these two sequences ($w_{d1}$ and $w_{d2}$) are effectively a first sequence and a second sequence, with the second sequence being circularly shifted with respect to the first. Each sequence $w_{di}$, i=1,2, is subsequently multiplied with a respective sign bit $r_i$, in the multiplying unit 40, where $r_i$=+1 or −1. The respective values of $r_1$ and $r_2$ remain constant, and only change when the payload of the watermark is changed. Each sequence is then converted into a periodic, slowly varying narrow-band signal $w_i$ of length $L_w T_s$ by the watermark conditioning circuit 20 shown in FIG. 4. Finally, the slowly varying narrow-band signals $w_1$ and $w_2$ are added with a relative delay $T_r$ (where $T_r < T_s$) to give the multi-bit payload watermark signal $w_c$. This is achieved by first delaying the signal $w_2$ by the amount $T_r$ using delaying unit 45 and subsequently by adding it to $w_1$ with the adding unit 50.

Figure 5:
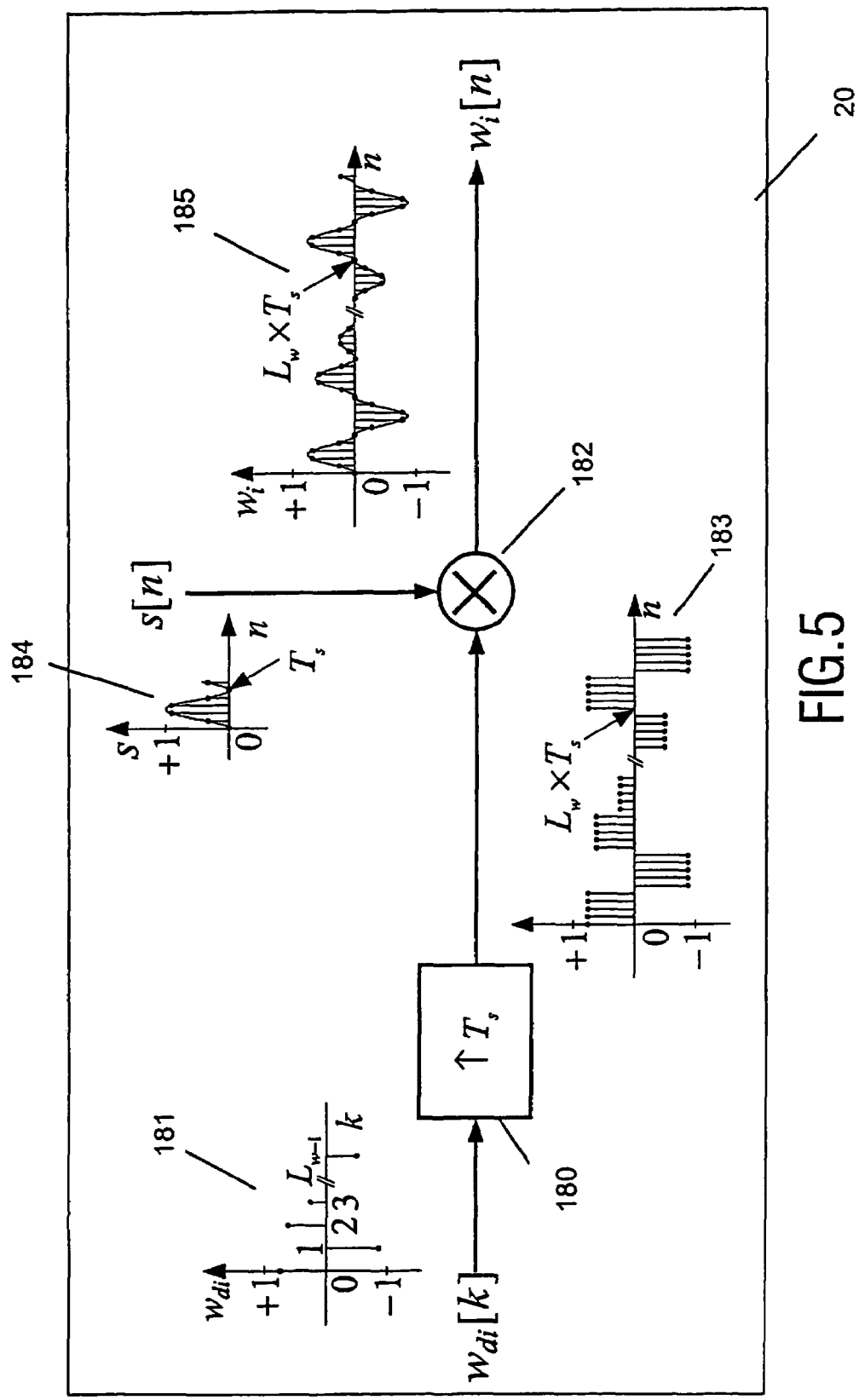
FIG. 5 is a diagram illustrating the details of the watermark conditioning apparatus $H_c$ of FIG. 4, including charts of the associated signals at each stage.

FIG. 5 shows the watermark conditioning apparatus 20 used in the payload embedder and watermark conditioning apparatus 6 in more detail. The watermark seed signal $w_s$ is input to the conditioning apparatus 20.

For convenience, the modification of only one of the sequences $w_{di}$ is shown in FIG. 5, but it will be appreciated that each of the sequences is modified in a similar manner, with the results being added to obtain the watermark signal $w_c$.

As shown in FIG. 5, each watermark signal sequence $w_{di}[k]$, i=1,2 is applied to the input of a sample repeater 180. Chart 181 illustrates one of the sequences $w_{di}$ as a sequence of values of random numbers between +1 and −1, with the sequence being of length $L_w$. The sample repeater repeats each value within the watermark seed signal sequence $T_s$ times, so as to generate a rectangular pulse train signal. $T_s$ is referred to as the watermark symbol period and represents the span of the watermark symbol in the audio signal. Chart 183 shows the results of the signal illustrated in chart 181 once it has passed through the sample repeater 180.

A window shaping function s[n], such as a raised cosine window, is then applied to convert the rectangular pulse functions derived from $w_{d1}$ and $w_{d2}$ into slowly varying watermark sequence functions $w_1[n]$ and $w_2[n]$ respectively.

Chart 184 shows a typical raised cosine window shaping function, which is also of span $T_s$.

The generated watermark sequences $w_1[n]$ and $w_2[n]$ are then added up with a relative delay $T_r$ (where $T_r < T_s$) to give the multi-bit payload watermark signal $w_c[n]$ i.e., $$w_c[n] = w_1[n] + w_2[n - T_r] \quad (5)$$

The value of $T_r$ is chosen such that the zero crossings of $w_1$ match the maximum amplitude points of $w_2$ and vice-versa. Thus, for a raised cosine window shaping function $T_r = T_s/2$, and for a bi-phase window shaping function $T_r = T_s/4$. For other window shaping functions, other values of $T_r$ are possible.

As will be appreciated by the below description, during detection the correlation of $w_c[n]$ will generate two correlation peaks that are separated by pL' (as can be seen in FIG. 15). pL' is an estimate of the circular shift pL between $w_{d1}$ and $w_{d2}$, which is part of the payload, and is defined as $$pL = |d_2 - d_1| \bmod(\lceil L_w/2 \rceil) \quad (6)$$

In addition to pL, extra information can be encoded by changing the relative signs of the embedded watermarks.

In the detector, this is seen as a relative sign $r_{sign}$ between the correlation peaks. It may be defined as:

$$r_{sign} = \frac{2 \cdot \rho_1 + \rho_2 + 3}{2} \in \{0, 1, 2, 3\} \quad (7)$$

where $\rho_1$=sign($cL_1$) and $\rho_2$=sign($cL_2$) are respectively estimates of the sign bits $r_1$ (input 80 and $r_2$ (input 90) of FIG. 4, and $cL_1$ and $cL_2$ are the values of the correlation peak corresponding to $w_{d1}$ and $w_{d2}$ respectively. The overall watermark payload $pL_w$, for an error-free detection, is then given as a combination of $r_{sign}$ and pL:

$$pL_w = \langle r_{sign}, pL \rangle. \quad (8)$$

The maximum information ($I_{max}$), in number of bits, that can be carried by a watermark sequence of length $L_w$ is thus given by:

$$I_{max} = \log_2(4 \cdot \lceil L_w/2 \rceil) \text{ bits} \quad (9)$$

In such a scheme, the payload is immune to relative offset between the embedder and the detector, and also to possible time scale modifications.

Figures 6A, 6B:
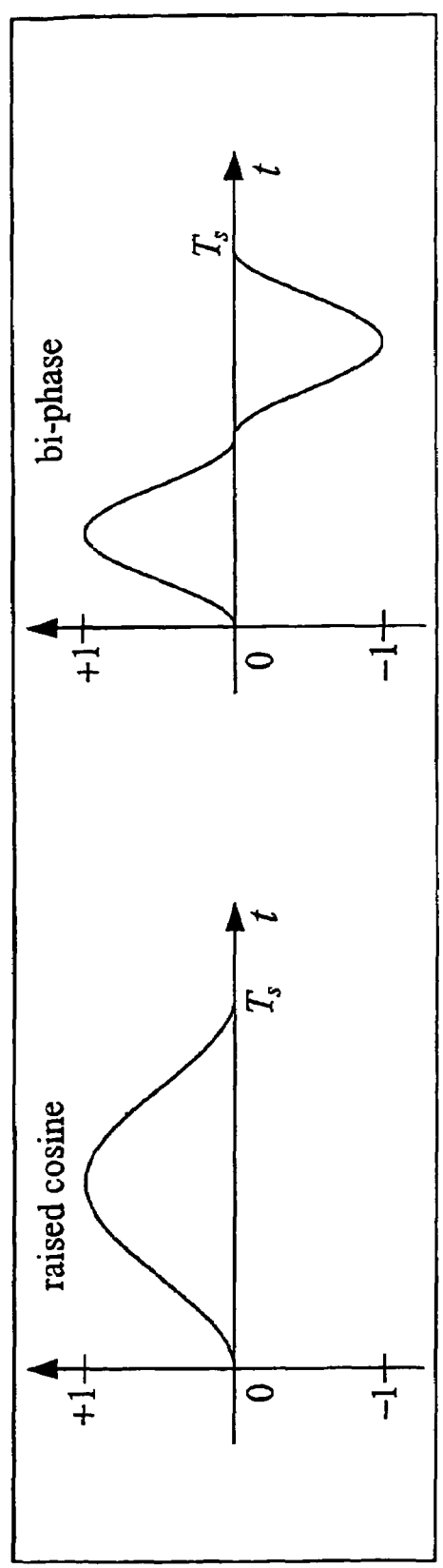
FIGS. 6a and 6b show two preferred alternative window shaping functions s(n) in the form of respectively a raised cosine function and a bi-phase function.

The window shaping function has been identified as one of the main parameters that controls the robustness and audibility behavior of the present watermarking scheme. As illustrated in FIGS. 6a and b, two examples of possible window shaping functions are herein described—a raised cosine function and a bi-phase function.

It is preferable to use a bi-phase window function instead of a raised cosine window function, so as to obtain a quasi DC-free watermark signal. This is illustrated in FIGS. 7a and 7b, showing the frequency spectra corresponding to a watermark sequence (in this case a sequence of $w_{di}[k]$={1, 1,−1,1,−1,−1,}) conditioned with respectively a raised cosine and a bi-phase window shaping function. As can be seen, the frequency spectrum for the raised cosine conditioned watermark sequence has a maximum at frequency f=0, whilst the frequency spectrum for the bi-phase shaped watermark sequence has a minimum at f=0 i.e. it has very little DC component.

Useful information is only contained in the non-DC component of the watermark. Consequently, for the same added watermark energy, a watermark conditioned with the bi-phase window will carry more useful information than one conditioned by the raised cosine window. As a result, the bi-phase window offers superior audibility performance for the same robustness or, conversely, it allows a better robustness for the same audibility quality.

Such a bi-phase function could be utilized as a window shaping function for other watermarking schemes. In other words, a bi-phase function could be applied to reduce the DC component of signals (such as a watermark) that are to be incorporated into another signal.

FIG. 8 shows a block diagram of a watermark detector (200, 300, 400). The detector consists of three major stages: (a) the watermark symbol extraction stage (200), (b) the buffering and interpolation stage (300), and (c) the correlation and decision stage (400).

In the symbol extraction stage (200), the received watermarked signal y'[n] is processed to generate multiple ($N_b$) estimates of the watermarked sequence. These estimates of the watermark sequence are required to resolve time offset that may exist between the embedder and the detector, so that the watermark detector can synchronize to the watermark sequence inserted in the host signal.

In the buffering and interpolation stage (300), these estimates are de-multiplexed into $N_b$ separate buffers, and an interpolation is applied to each buffer to resolve time scale modifications that may have occurred, e.g. a drift in sampling (clock) frequency may have resulted in a stretch or shrink in the time domain signal (i.e. the watermark may have been stretched or shrunk).

In the correlation and decision stage (400), the content of each buffer is correlated with the reference watermark and the maximum correlation peaks are compared against a threshold to determine the likelihood of whether the watermark is indeed embedded within the received signal y'[n].

In order to maximize the accuracy of the watermark detection, the watermark detection process is typically carried out over a length of received signal y'[n] that is 3 to 4 times that of the watermark sequence length. Thus each watermark symbol to be detected can be constructed by taking the average of several estimates of said symbol. This averaging process is referred to as smoothing, and the number of times the averaging is done is referred to as the smoothing factor $s_f$. Let $L_D$ be the detection window length, defined as the length of the audio segment (in number of samples) over which a watermark detection truth-value is reported. Then, $L_D = s_f L_w T_s$, where $T_s$ is the symbol period and $L_w$ the number of symbols within the watermark sequence. During symbol extraction, a factor $T_s$ decimation takes place in the energy computation stage. Thus, the length ($L_b$) of each buffer 320 within the buffering and interpolation stage is $L_b = s_f L_w$.

In the watermark symbol extraction stage 200 shown in FIG. 8, the incoming watermark signal y'[n] is input to the optional signal conditioning filter $H_b$(210). This filter 210 is typically a band pass filter and has the same behavior as the corresponding filter (H, 15) shown in FIG. 2. The output of the filter $H_b$ is y'$_b$[n] and, assuming linearity within the transmission medium, it follows from equations (1) and (3):

$$y'_b[n] \approx y_b[n] = (1 + \alpha w[n])x_b[n] \quad (10)$$

Note that in the above expression, the possible time offset between the embedder and the detector is implicitly ignored. For ease of explanation of the general watermarking scheme principles, from now on, it is assumed that there is perfect synchronism between the embedder and the detector (i.e. no offset). Explanation is given however below in reference to FIG. 11 of how to compensate for time offset in accordance with the present invention.

Note that when no filter is used in the embedder (i.e., when H=1) then $H_b$ in the detector can also be omitted, or it can still be included to improve the detection performance. If $H_b$ is omitted, then $y_b$ in equation (10) is replaced with y. The rest of the processing is the same.

We assume that the audio signal is divided into frames of length $T_s$, and that y'$_{b,m}$[n] is the n-th sample of the m-th filtered frame signal. The energy E[m] corresponding to the m-th frame is thus:

$$E[m] = \sum_{n=0}^{T_s-1} |y'_{b,m}[n]|^2 \quad (11)$$

Combining this with equation 10, it follows that:

$$E[m] \approx \sum_{n=0}^{T_s-1} |y_{b,m}[n]|^2 = \sum_{n=0}^{T_s-1} |(1 + \alpha w_e[m])x_{b,m}[n]|^2 \quad (12)$$

where $w_e$[m] is the m-th extracted watermark symbol and contains $N_b$ time-multiplexed estimates of the embedded watermark sequences. Solving for $w_e$[m] in equation 12 and ignoring higher order terms of α, gives the following approximation:

$$w_e[m] \approx \frac{1}{2\alpha}\left(\frac{\sum_{n=0}^{T_s-1} |y_{b,m}[n]|^2}{\sum_{n=0}^{T_s-1} |x_{b,m}[n]|^2} - 1\right) \quad (13)$$

In the watermark extraction stage 200 shown in FIG. 8, the output y'$_b$[n] of the filter $H_b$ is provided as an input to a frame divider 220, which divides the audio signal into frames of length $T_s$ i.e. into y'$_{b,m}$[n], with the energy calculating unit 230 then being used to calculate the energy corresponding to each of the framed signals as per equation (12). The output of this energy calculation unit 230 is then provided as an input to the whitening stage $H_w$ (240) which performs the function shown in equation 13 so as to provide an output $w_e$[m]. Alternative implementations (240A, 240B) of this whitening stage are illustrated in FIGS. 9 and 10.

It will be realized that the denominator of equation 13 contains a term that requires knowledge of the host signal x. As the signal x is not available to the detector, it means that in order to calculate $w_e$[m] then the denominator of equation 13 must be estimated.

Below is described how such an estimation can be achieved for the two described window shaping functions (the raised cosine window shaping function and the bi-phase window shaping function), but it will equally be appreciated that the teaching could be extended to other window shaping functions.

In relation to the raised cosine window shaping function shown in FIG. 6(a), it has been realized that the audio envelope induced by the watermark contributes only to the noisy part of the energy function E[m]. The slowly varying part (i.e. the low frequency component) is predominately due to the contribution of the envelope of the original audio signal x. Thus, equation 13 may be approximated by:

$$w_e[m] \approx \frac{1}{2\alpha}\left(\frac{E[m]}{lowpass(E[m])} - 1\right) \quad (14)$$

where "lowpass(.)" is a low pass filter function. Thus, it will be appreciated that the whitening filter $H_w$ for the raised cosine window shape in the function can be realized as shown in FIG. 9.

As can be seen, such a whitening filter $H_w$ (240A) comprises an input 242A for receiving the signal E[m]. A portion of this signal is then passed through the low pass filter 247A to produce a low pass filtered energy signal $E_{LP}$[m], which in turn is provided as an input to the calculation stage 248A along with the function E[m]. The calculation stage 248A then divides E[m] by $E_{LP}$[m] to calculate the extracted watermark symbol $w_e$[m].

When a bi-phase window function is employed in the watermark conditioning stage of the embedder, a different approach should be utilized to estimate the envelope of the original audio, and hence to calculate $w_e$[m].

It will be seen by examination of the bi-phase window function shown in FIG. 6b, that when the audio envelope is modulated with such a window function, the first and the second halves of the frame are scaled in opposite directions. In the detector, this property is utilized to estimate the envelope energy of the host signal x.

Consequently, within the detector, each audio frame is first subdivided into two halves. The energy functions corresponding to the first and second half-frames are hence given by $$E_1[m] = \sum_{n=0}^{T_s/2-1} |y'_{b,m}[n]|^2 \quad (15)$$

and $$E_2[m] = \sum_{n=T_s/2}^{T_s-1} |y'_{b,m}[n]|^2 \quad (16)$$

respectively. As the envelope of the original audio is modulated in opposite directions within the two sub-frames, the original audio envelope can be approximated as the mean of $E_1[m]$ and $E_2[m]$.

Further, the instantaneous modulation value can be taken as the difference between these two functions. Thus, for the bi-phase window function, the watermark $w_e[m]$ can be approximated by:

$$w_e[m] \approx \frac{1}{2\alpha}\left(\frac{E_1[m] - E_2[m]}{E_1[m] + E_2[m]} - 1\right) \quad (17)$$

Consequently, the whitening filter $H_w$ (240B) in FIG. 8 for a bi-phase window shaping function can be realized as shown in FIG. 10. Inputs 242B and 243B respectively receive the energy functions of the first and second half frames $E_1[m]$ and $E_2[m]$. Each energy function is then split up into two, and provided to adders 245B and 246B which respectively calculate $E_1[m]-E_2[m]$, and $E_1[m]+E_2[m]$. Both of these calculated functions are then passed to the calculating unit 248B which divides the value from adder 245B by the value from 246B so as to calculate $w_w[m]$, containing $N_b$ time-multiplexed estimates of the embedded watermark sequences, in accordance with equation 17.

This output $w_e[m]$ is then passed to the buffering and interpolation stage 300 (FIG. 8), where the signal is de-multiplexed by a de-multiplexer 310, buffered in buffers 320 of length $L_b$, so as to resolve a lack of synchronism between the embedder and the detector, and interpolated within the interpolation unit 330 so as to compensate for a time scale modification between the embedder and the detector.

In order to maximize the possible robustness of a watermark, it is important to make sure that the watermarking system is immune to both time offsets and drifts in sampling frequency between the embedder and the detector. In other words, the watermark detector must be able to synchronize to the watermark sequence inserted in the host signal.

FIG. 11 illustrates the process carried out by the buffering and interpolation stage 300 to resolve the offset issue. The example described illustrates the process for resolving offset when a raised cosine window shaping function has been employed in the watermark embedding process. However, in principle the same technique is applicable when the bi-phase window shaping function has been used.

Referring to FIG. 11, after filtering by the filter $H_b$ 210, the incoming audio signal streamy $y'_b[n]$ is separated into preferably overlapping frames 302 of effective length $T_s$ by the frame divider 220.

Preferably, to resolve possible offset between the embedder and the detector, each frame is divided into $N_b$ sub-frames (304a, 304b, . . . ,304x), and the above computations (equations (12) to (17)) are applied on a sub-frame basis.

Preferably, each sub-frame overlaps with an adjacent sub-frame. In the example shown, it can be seen that there is a 50% overlap ($T_s/N_b$) of each sub-frame (304a, 304b, . . . , 304x), with each of the sub-frames being of length $2T_s/N_b$. When overlapping sub-frames are considered, the main frames are preferably longer than the symbol period $T_s$ so as to allow inter-frame overlap as shown in FIG. 11.

The energy of the audio is then computed for each sub-frame by the whitening stage 240, and the resulting values are de-multiplexed into the $N_b$ buffers 320 by the de-multiplexer 310. Each one ($B_1$, $B_2$, . . . , $B_{Nb}$) of the buffers 320 will thus contain a sequence of values, with the first buffer $B_1$ containing a sequence of values corresponding to the first sub-frame within each frame, the second buffer $B_2$ containing a sequence of values corresponding to the second sub-frame within each frame etc.

If $w_{Di}$ is the content of the i-th buffer, then it can be shown that:

$$w_{Di}[k]=w_e[k \cdot N_b+i], k \in \{0, \ldots, L_b-1\} \quad (18)$$

where $L_b$ is the buffer length.

For a raised cosine window shaping function, the energy of the embedded watermark is concentrated near the center of the frame, such that the sub-frame best aligned with the center of the frame will result in a distinctly better estimate of the embedded watermark symbol than all the other sub-frames. Effectively, each buffer thus contains an estimate of the symbol sequence, the estimates corresponding to the sequences having different time offsets.

The sub-frame best aligned with the center of the frame (i.e. the best estimate of the correctly aligned frame) is determined by correlating the contents of each buffer with the reference watermark sequence. The sequence with the maximum correlation peak value is chosen as the best estimate of the correctly aligned frame. The corresponding confidence level, as described below, is used to determine the truth-value of the detection. Preferably, the correlation process is halted once an estimated watermark sequence with a correlation peak above the defined threshold has been found.

Typically, the length of each buffer is between 3 to 4 times the watermark sequence length $L_w$, and is thus typically of length between 2048 and 8192 symbols, and $N_b$ is typically within the range of 2 to 8.

The buffer is normally 3 to 4 times that of the watermark sequence so that each watermark symbol can be constructed by taking the averages of several estimates of said symbol. This averaging process is referred to as smoothing, and the number of times the averaging is done is referred to as the smoothing factor $s_f$. Thus, given the buffer length $L_b$ and the watermark sequence length $L_w$, the smoothing factor $s_f$ is such that:

$$L_b = s_f L_w \quad (19)$$

In another preferred embodiment, the detector refines the parameters used in the offset search based upon the results of a previous search step. For instance, if a first series of estimates shows that the results stored in buffer $B_3$ provide the best estimate of the information signal, then the next offset search (either on the same received signal, or on the signal received during the next detection window) is refined by shifting the position of the sub-frames towards the position of the best estimate sub-frame. The estimates of the sequence having zero offset can thus be iteratively improved.

As previously mentioned, there can exist a drift in sampling (clock) frequency in digital devices, which results in a stretch or shrink in the time domain signal.

For instance, consider an audio segment s of length L that is time scaled such that it's new length becomes $L_\eta=L(1+\eta)$ where $\eta$ is the time scaling factor, with $\eta$ being a constant such that $1+\eta>0$; for a time stretch $\eta>0$, and for a time shrink $\eta<0$.

When the signal is not time scale modified ($\eta=0$), $N_b$ estimates of the watermark sequence are constructed by collecting the symbols stored in the $N_b$ buffers separately.

FIG. 12 illustrates four buffers (B1, B2, B3, B4), each buffer shown as a row of boxes, with each box within a row indicating a separate location within the respective buffer. The sequences $w_{f1}$, $w_{f2}$, $w_{f3}$, $w_{f4}$ are respective estimates of the watermark sequence. In the example shown in FIG. 12, it is assumed that the signal is not time scale modified, and hence each estimate ($w_{f1}$, $w_{f2}$, $w_{f3}$, $w_{f4}$) represents an estimate of the watermark sequence with different time offset.

Consequently, each estimate (that is passed to the correlator 410) is formed by sequentially collecting the entries from each buffer. For example, the first value in sequence $w_{f1}$ ($w_{f1}$ [1]) is collected from the first location of B1, the second ($w_{f1}$ [2]) from the second location of B1 etc, with the final value ($w_{f1}$ [$L_b$]) being collected from the final location of the buffer. It will be appreciated that the arrows, which connect each box in a row to the neighboring box, show the direction in which values of the sequence estimates are collected from the buffer locations. It will also be appreciated that, whilst only eleven buffer locations are shown for each buffer, the size of the buffers in practice is likely to be significantly larger than this. For example, in the preferred embodiment, the length of each buffer is typically between 2048 and 8192 locations, with the number of buffers typically being between 2 and 8. However, in order to prevent overflow of buffers during time scale search, the actual buffer lengths are set to $(1+\lceil\eta_{max}\rceil)$ times the typical lengths specified above, where $\eta_{max}$ is the expected maximum scaling factor.

When the received signal y'[n] has been time scale modified, it is necessary to perform a time scale search in order to correctly estimate the watermark sequence. In the present invention, such a search is performed by systematically combining the extracted watermark sequence estimates ($w_e[m]$), preferably by systematically combining (interpolating) the different estimates of the watermark sequences stored in the buffers.

Such time scale searches can be performed by utilizing any order of interpolation. In the following two preferred embodiments, two orders of interpolation will be described—the first order (linear) interpolation and the zero order interpolation. However, it will be appreciated that this technique can be extended to higher orders of interpolation e.g. quadratic and cubic interpolation.

In the first embodiment, estimates of the time scaled watermark sequence are provided by applying linear interpolation to the previously extracted estimates of the watermark sequence.

To this end, it can be assumed that the intermediate values $w_e[k]$ generated by the symbol extraction step shown in FIG. 8 are sequentially stored in a single buffer of length M in place of the $N_b$ buffers. In other words, that the $N_b$ buffers are multiplexed into a single buffer of length $M=N_b s_f L_w$, where $L_w$ and $s_f$ are as defined earlier. Let the so stretched sequence be represented by $w_D$. It can now be assumed that $w_D$ represents discrete samples of an otherwise continuous function. During time scale modification, these discrete points are either pushed towards each other or stretched out. This in turn is translated to re-sampling of the watermark function.

In this embodiment, re-sampling is realized via a linear interpolation technique. That is, given the watermark sequence $w_D[m], m=1, \ldots, M$, an interpolated watermark sequence $w_1[m]$ is generated as $$w_1[m]=\mu w_D(\lfloor(1+\eta)m\rfloor)+(1-\mu)w_D(\lceil(1+\eta)m\rceil) \quad (20)$$

Where $\mu=\lceil(1+\eta)m\rceil-(1+\eta)m$, and $\lceil\cdot\rceil$ and $\lfloor\cdot\rfloor$ are the floor and the ceiling operators, respectively. After the interpolation, the watermark sequences are folded back into the $N_b$ buffers in a similar way to that shown in FIG. 11. Let the interpolated watermark sequence folded into the buffer $b\in\{0, \ldots, N_b-1\}$ be denoted by $w_{1,b}[k]$, then it can be shown that $$w_{1,b}[k]=\mu w_D(\lfloor(N_b k+b)(1+\eta)\rfloor)+(1-\mu)w_D(\lceil(N_b k+b)(1+\eta)\rceil). \quad (21)$$

Let for $b=1, \ldots, N_b$, $w_{D,b}[k]$ be the pre-interpolation sequence stored in the b-th buffer, and $q_{pk}\in\{1, \ldots s_f L_w\}$ and $r_{pk}\in\{1, \ldots N_b\}$ be defined as $$q_{bk}=\left\lfloor\frac{(\lfloor(N_b k+b)(1+\eta)\rfloor)}{N_b}\right\rfloor$$

and $$r_{bk}=(\lfloor(N_b k+b)(1+\eta)\rfloor)-N_b\left\lfloor\frac{(\lfloor(N_b k+b)(1+\eta)\rfloor)}{N_b}\right\rfloor.$$

Then, it can be shown that $w_D(\lfloor(N_b k+b)(1+\eta)\rfloor)=w_{D,\eta bk}[q_{bk}]$. Putting this into equation (21), it follows that $$w_{1,b}[k]=\mu w_{D,r_{bk}}[q_{bk}[k]]+(1-\mu)w_{D,(r_{bk}+1)}[q_{bk}+1] \quad (22)$$

Thus, the interpolated buffer entries can be calculated directly from the $N_b$ sequences $w_{D,b}$, $b=1, \ldots, N_b$ (as shown in FIG. 8, being passed to the correlator 410), by solving equation (22).

A further embodiment of the present invention will now be described, in which estimates of the time scaled watermark sequence are provided by applying zero order interpolation to the previously extracted estimates of the watermark sequence. This approach can be represented with equation (22) with $\mu=1$. In this case, the interpolation function can be written as $$w_{1,b}[k]=w_{D,r_{bk}}[q_{bk}[k]], \quad (23)$$

where $q_{pk}\in\{1, \ldots s_f L_w\}$ and $r_{pk}\in\{1, \ldots N_b\}$ are as defined above.

A graphical interpretation of equation (23) is shown in FIGS. 13a & b. FIG. 13a shows how the different estimates of the correct watermark sequences ($w_{f1}$, $w_{f2}$, $w_{f3}$, $w_{f4}$) are extracted from the buffers for a time stretch, whilst FIG. 13b shows similar information for a time shrink. As in FIG. 12, each row of boxes represents a respective buffer, with each box representing a location within each buffer. The arrows indicate the order in which the buffer contents are collected from the estimates of the watermark sequences.

When the audio signal is time scale modified, the start and the end of the framing will gradually drift backward or forward, depending respectively upon whether the signal is time scale stretched or compressed. The watermark symbol combining stage according to this embodiment tracks the size of the drift. When the absolute value of the cumulative drift exceeds $T_s/N_b$ (where $N_b$ is the number of buffers i.e. the number of consecutive symbols that represent a single watermark symbol), then the symbol collection sequence from the buffers is adjusted to provide the next best estimate of the symbol from the buffers. In other words, the buffer counters are incremented or decremented (depending on drift direction), and a circular rotation of the buffer pointer for each watermark sequence estimation ($w_{f1}$, $w_{f2}$, $w_{f3}$, $w_{f4}$) is performed.

Let k be the buffer entry counter, where k is an integer representing each location within each buffer i.e. k=1 represents the first location within each buffer, k=2 the second etc. If the estimates of the watermark sequence are being taken from the buffers with no time scale modification (as shown in FIG. 12), then it will be appreciated that the values in the first sequence can be represented by $w_{f1}[k]$.

However, for time scaled estimates, assuming that an estimate η is being made of the time scale, then when $$|\eta k| \approx \frac{n}{N_b},$$

where n is any integer (and in this example $N_b$=4), the counter values and the buffers from which the watermark estimates are taken are changed.

If η is positive (time stretch), the counter for the first buffer is incremented. The ordering of the buffers is also circularly shifted (i.e. the watermark sequence estimate $w_{f1}$ previously being taken from buffer one will now been taken from buffer four, the estimate from buffer two will now be taken from buffer one, the estimate from three will now be taken from buffer two, and the estimate from buffer four will now be taken from buffer three). A similar circular shift is also performed on the buffer counter k. This is shown diagrammatically in FIG. 13a.

If η is negative (time stretch), the counter for the first buffer is incremented, and the ordering of the buffers is circularly shifted (i.e. the watermark sequence estimate $w_{f1}$ previously being taken from buffer one will now be taken from buffer two, the estimate from buffer two will now be taken from buffer three, the estimate from three will now be taken from buffer four, and the estimate from buffer four will now betaken from buffer one). A similar circular shift is also performed on the buffer counter k. This is shown diagrammatically in FIG. 13b.

After these circular shifts and adjustment to the buffer counters have been performed the symbol collection to form the different estimates of the watermark sequences continues from left to right until $|\eta k| \approx (n+1)/N_b$ (i.e. the next interchange position is reached). The process of buffer order interchanging and the sequential symbol collection is then repeated until the end of the buffer is reached.

Consequently, it will be appreciated that a zeroth order interpolation of the time scaled watermark sequence has been performed. In other words, the time scaled watermark sequence has been estimated by selecting those values from the original, non time scaled watermark sequence estimates that would most closely correspond to the temporal positions of the time scaled watermark sequence. By utilizing previously extracted estimates of the watermark sequence, such a technique efficiently resolves the problems of estimating correctly time scaled watermarks, with minimal cost in terms of computational overhead.

Such estimates of the time scaled watermark sequence will then be passed to the correlator (410), so as to determine whether the predicted time shift η accurately represents the time shift of the received signal i.e. do the estimates provided to the correlator provide good correlation peaks. If not, then the time scale search will be repeated for a different estimated value i.e. a different value of η.

Due to possible time scale modification, the detection truth-value (whether or not the signal includes a watermark) is determined only after the appropriate scale search has been conducted. Let Δη be the scale search step size and let us assume that we want the watermark to survive all the scale modifications in the interval [$\eta_{min}$, $\eta_{max}$]. The total number of visited scales is then given by $$N_\eta = \frac{\eta_{max} - \eta_{min}}{\Delta \eta} \quad (24)$$

To minimize $N_\eta$ it is preferred to find the maximum value of Δη that can still allow an exhaustive scale search. To this end, experimental results show that the detection performance is not significantly affected if the time scaling does not exceed half of the inverse of the buffer length. This means that, for an exhaustive scale search, Δη should be such that $$\Delta \eta \leq \frac{2}{N_b s_f L_w}$$

Putting this into equation (24), it follows that it is preferable to conduct a search over $$N_\eta = \frac{N_b s_f L_w}{2}(\eta_{max} - \eta_{min}) \quad (25)$$

time scales in order to conduct an exhaustive scale search. Clearly, any scale search can be time consuming. Thus, the complexity issue and cost in computing overhead should be considered when choosing the watermark embedding parameters $N_b$, $s_f$ and $L_w$.

In one preferred embodiment the scale search is adapted such that information acquired during detection is utilized to plan an optimum search in the subsequent detection windows. For example, the scale search in the next detection window is started around the current optimum scale.

An alternative embodiment illustrated in FIG. 14 provides a method for efficient walk through the scale space by grid refinement. The most straightforward solution is a linear search from the minimum scale towards the maximum scale by adding up an incremental step. Assuming correlation, and thus confidence level, does not change abruptly from one scale to the next, one can considerably reduce the amount of scales visited during the search by reducing the space granularity. As shown in FIG. 14, the algorithm starts at scale zero and is repeated until a minimum granularity is reached or the watermark is detected (i.e., a local maximum for the confidence level is found) and/or the confidence level exceeds a predetermined threshold. When one has an indication where to start the scale search (e.g. an initial estimation from a previous detection), a random or linear search around this scale may suffice.

As shown in FIG. 8, outputs ($w_{D1}$, $w_{D2}$, ... $w_{DNb}$) from the buffering stage are passed to the interpolation stage and, after interpolation, the outputs ($w_{I1}$, $w_{I2}$, ... $w_{INb}$) of this stage, which are needed to resolve a possible time scale modification in the watermarked signal, are passed to the correlation and decision stage. All of the estimates ($w_{I1}$, $w_{I2}$, ... $w_{INb}$) of the watermark corresponding to the different possible offset values are passed to the correlation and decision stage 400.

The correlator 410 calculates the correlation of each estimate $w_{Ij}$, j=1 ... ,$N_b$ with respect to the reference watermark sequence $w_c[k]$. Each respective correlation output corresponding to each estimate is then applied to the maximum detection unit 420 which determines which two estimates provided the maximum correlation peak values. These estimates are chosen as the ones that best fit the circularly shifted versions $w_{d1}$ and $w_{d2}$ of the reference watermark. The correlation values for these estimated sequences are passed to the threshold detector and payload extractor unit 430.

The reference watermark sequence $w_s$ used within the detector corresponds to (a possibly circularly shifted version of) the original watermark sequence applied to the host signal. For instance, if the watermark signal was calculated using a random number generator with seed S within the embedder, then equally the detector can calculate the same random number sequence using the same random number generation algorithm and the same initial seed S so as to determine the watermark signal. Alternatively, the watermark signal originally applied in the embedder and utilized by the detector as a reference could simply be any predetermined sequence.

FIG. 15 shows a typical shape of a correlation function as output from the correlator 410. The horizontal scale shows the correlation delay (in terms of the sequence samples). The vertical scale on the left hand side (referred to as the confidence level cL) represents the value of the correlation peak normalized with respect to the standard deviation of the normally distributed correlation function.

As can be seen, the typical correlation is relatively flat with respect to cL, and centered about cL=0. However, the function contains two peaks, which are separated by pL (see equation 6) and extend upwards to cL values that are above the detection threshold when a watermark is present. When the correlation peaks are negative, the above statement applies to their absolute values.

A horizontal line (shown in the Fig. as being set at cL=8.7) represents the detection threshold. The detection threshold value controls the false alarm rate.

Two kinds of false alarms exist: The false positive rate, defined as the probability of detecting a watermark in non watermarked items, and the false negative rate, which is defined as the probability of not detecting a watermark in watermarked items. Generally, the requirement of the false positive alarm is more stringent than that of the false negative. The scale on the right hand side of FIG. 11 illustrates the probability of a false positive alarm p. As can be seen in the example shown, the probability of a false positive $p=10^{-12}$ is equivalent to the threshold cL=8.7, whilst $p=10^{-83}$ is equivalent to cL=20.

After each detection interval, the detector determines whether the original watermark is present or whether it is not present, and on this basis outputs a "yes" or a "no" decision. If desired, to improve this decision making process, a number of detection windows may be considered. In such an instance, the false positive probability is a combination of the individual probabilities for each detection window considered, dependent upon the desired criteria. For instance, it could be determined that if the correlation function has two peaks above a threshold of cL=7 on any two out of three detection intervals, then the watermark is deemed to be present. Such detection criteria can be altered depending upon the desired use of the watermark signal and to take into account factors such as the original quality of the host signal and how badly the signal is likely to be corrupted during normal transmission.

The payload extractor unit 430 may subsequently be utilized to extract the payload (e.g. information content) from the detected watermark signal. Once the unit has estimated the two correlation peaks $cL_1$ and $cL_2$ that exceed the detection threshold, an estimate cL' of the circular shift cL (defined in equation (6)) is derived as the distance between the peaks. Next, the signs $\rho_1$ and $\rho_2$ of the correlation peaks are determined, and hence $r_{sign}$ calculated from equation (7). The overall watermark payload may then be calculated using equation (8).

For instance, it can be seen in FIG. 15 that pL is the relative distance between the two peaks. Both peaks are positive i.e. $\rho_1=+1$, and $\rho_2=+1$. From equation (7), $r_{sign}=3$. Consequently, the payload $pL_w=<3, pL>$.

It will be appreciated by the skilled person that various implementations not specifically described would be understood as falling within the scope of the present invention. For instance, whilst only the functionality of the detecting apparatus has been described, it will be appreciated that the apparatus could be realized as a digital circuit, an analog circuit, a computer program, or a combination thereof.

Equally, whilst the above embodiment has been described with reference to an audio signal, it will be appreciated that the present invention can be applied to add information to other types of signal, for instance information or multimedia signals, such as video and data signals.

Further, it will be appreciated that the invention can be applied to watermarking schemes containing only one watermarking sequence (i.e. a 1-bit scheme), or to watermarking schemes containing multiple watermarking sequences. Such multiple sequences can be simultaneously or successively embedded within the host signal.

Within the specification it will be appreciated that the word "comprising" does not exclude other elements or steps, that "a" or "and" does not exclude a plurality, and that a single processor or other unit may fulfil the functions of several means recited in the claims.

The invention claimed is:

1. A computer readable storage medium including a set of instructions executable by a processor, the set of instructions operable for a method of compensating for a linear time scale change in a received signal, the received signal being modified by a sequence of symbols in the time domain, the method comprising the steps of:
   (a) extracting an initial estimate of the sequence of symbols from said received signal; and
   (b) forming an estimate of a correctly time scaled sequence of the sequence of symbols by interpolating the values of said initial estimate, the estimate compensating for the linear time scale change in the received signal, wherein the forming step is repeated to provide a range of estimates corresponding to different time scalings.

2. The computer readable storage medium as claimed in claim 1, wherein said interpolation is at least one of zeroth order interpolation, linear interpolation, quadratic interpolation and cubic interpolation.

3. The computer readable storage medium as claimed in claim 1, the method further comprising the step of processing each estimate as though it were the correctly time scaled sequence of the sequence of symbols, so as to determine which estimate is the best estimate.

4. The computer readable storage medium as claimed in claim 1, the method further comprising the steps of correlating each of said estimates with a reference corresponding to said sequence of symbols; and taking the estimate with the maximum correlation peak as the best estimate.

5. The computer readable storage medium as claimed in claim 1, wherein said initial estimate of the sequence of symbols is stored in a buffer.

6. The computer readable storage medium as claimed in claim 5, wherein said buffer is of total length M, the total number of scale searches conducted is $$N_\eta = \frac{M}{2}(\eta_{max} - \eta_{min})$$

where $\eta_{min}$, $\eta_{max}$ correspond respectively to the minimum and maximum likely time scale modifications of the received signal.

7. The computer readable storage medium as claimed in claim 1, wherein said initial estimate of the sequence of symbols comprises a sequence of $N_b$ estimates for each symbol, each of the $N_b$ estimates corresponding to a different time offset of a symbol for a buffer b.

8. The computer readable storage medium as claimed in claim 1, wherein a scale search in the next detection window is adapted based on the information acquired during a current detection window.

9. The computer readable storage medium as claimed in claim 1, wherein a scale space is searched using an optimal searching algorithm.

10. The computer readable storage medium as claimed in claim 9, wherein the optimal searching algorithm is the grid refinement algorithm.

11. An apparatus arranged to compensate for a linear time scale change in a received signal, the received signal being modified by a sequence of symbols in the time domain, the apparatus comprising:

an extractor arranged to extract an initial estimate of the sequence of symbols from said received signal; and an interpolator arranged to form an estimate of a correctly time scaled sequence of the symbols by interpolating the values of said initial estimate, the interpolator repeating the forming to provide a range of estimates corresponding to different time scalings.

12. The apparatus as claimed in claim 11, the apparatus further comprising a buffer arranged to store one or more of said estimates.

13. A decoder comprising the apparatus as claimed in claim 11.

* * * * *